United States Patent
Verma et al.

(10) Patent No.: US 9,444,945 B1
(45) Date of Patent: Sep. 13, 2016

(54) ALERT PUCK SYSTEM WITH VOIP CALLBACK FOR EMERGENCY RESPONSE

(71) Applicant: VSN TECHNOLOGIES, INC., Fort Lauderdale, FL (US)

(72) Inventors: Amit Verma, Sunrise, FL (US); Julio A. Abdala, Southwest Ranches, FL (US); Moises De La Cruz, Miramar, FL (US); Hao Nguyen, Lake Worth, FL (US); Guillermo Padin, Coral Springs, FL (US); Biren Patel, Coral Springs, FL (US); Jose Ruiz, Coral Springs, FL (US); Vinosh Diptee, Sunrise, FL (US)

(73) Assignee: VSN TECHNOLOGIES, INC., Fort Lauderdale, FL (US)

( * ) Notice: Subject to any disclaimer, the term of this patent is extended or adjusted under 35 U.S.C. 154(b) by 171 days.

(21) Appl. No.: 14/291,994

(22) Filed: May 30, 2014

(51) Int. Cl.
*H04M 11/04* (2006.01)
*H04M 7/00* (2006.01)

(52) U.S. Cl.
CPC ............ *H04M 11/04* (2013.01); *H04M 7/006* (2013.01)

(58) Field of Classification Search
None
See application file for complete search history.

(56) References Cited

U.S. PATENT DOCUMENTS

| | | | |
|---|---|---|---|
| 8,868,028 B1* | 10/2014 | Kaltsukis | 455/404.2 |
| 2009/0186596 A1* | 7/2009 | Kaltsukis | 455/404.2 |
| 2010/0330952 A1* | 12/2010 | Yeoman | 455/404.2 |
| 2011/0021173 A1* | 1/2011 | Randhawa et al. | 455/404.1 |

* cited by examiner

*Primary Examiner* — Steven H Nguyen
(74) *Attorney, Agent, or Firm* — Patents on Demand P.A.; Brian K. Buchheit; Scott M. Garrett

(57) ABSTRACT

A system of an alert puck, a mobile communication device, and an alert server for facilitating a VOIP session with the mobile communication device responsive to an emergency event triggered by the alert puck. The alert puck comprises a housing enclosing a sealed volume, a power supply and control circuitry that includes a personal area network (PAN) interface. The mobile communication device comprises an operating system, an alert application executing upon the operating system, and a wireless transceiver. The alert server contacts a set of one or more previously defined contact devices, conveys an emergency message, and facilitates the VOIP session with the alert application, when a button is pressed on the alert puck.

20 Claims, 7 Drawing Sheets

ALERT PUCK SYSTEM WITH VOIP CALLBACK FOR EMERGENCY RESPONSE

BACKGROUND

The present invention relates to the field of low-power portable devices and, more particularly, to an alert puck, applications communicating with an alert puck, mobile devices hosting the applications, servers providing functions for an alert puck, and for server-based emergency response messaging with call back triggered from an alert puck, as detailed herein.

Traditional computing devices, such as personal computers and telephones, have been stand-alone devices that performed computing functions for an end-user. Each device has included its own user operating system, user interface, and peripherals for input/output. Increasingly, computing devices are connected to the internet, which interconnects people and devices to each other.

Computing technologies are presently evolving to integrate computing technologies into the real-world thereby going "beyond the screen". The internet of things (IoT) is a type of technology where devices and objects, such as consumer electronic devices exchange information and interoperate across a network space. Wearables are another type of technology that are designed to be personally worn by end-users, but which may require interoperation with companion devices to exhibit meaningful functionality. As computing technologies continue to evolve along this trajectory, there will be an increased need for small low-power devices for sensing environmental states and interacting with end users/other devices as well as an infrastructure to support communications between these diverse devices.

DETAILED DESCRIPTION

Figure 1:
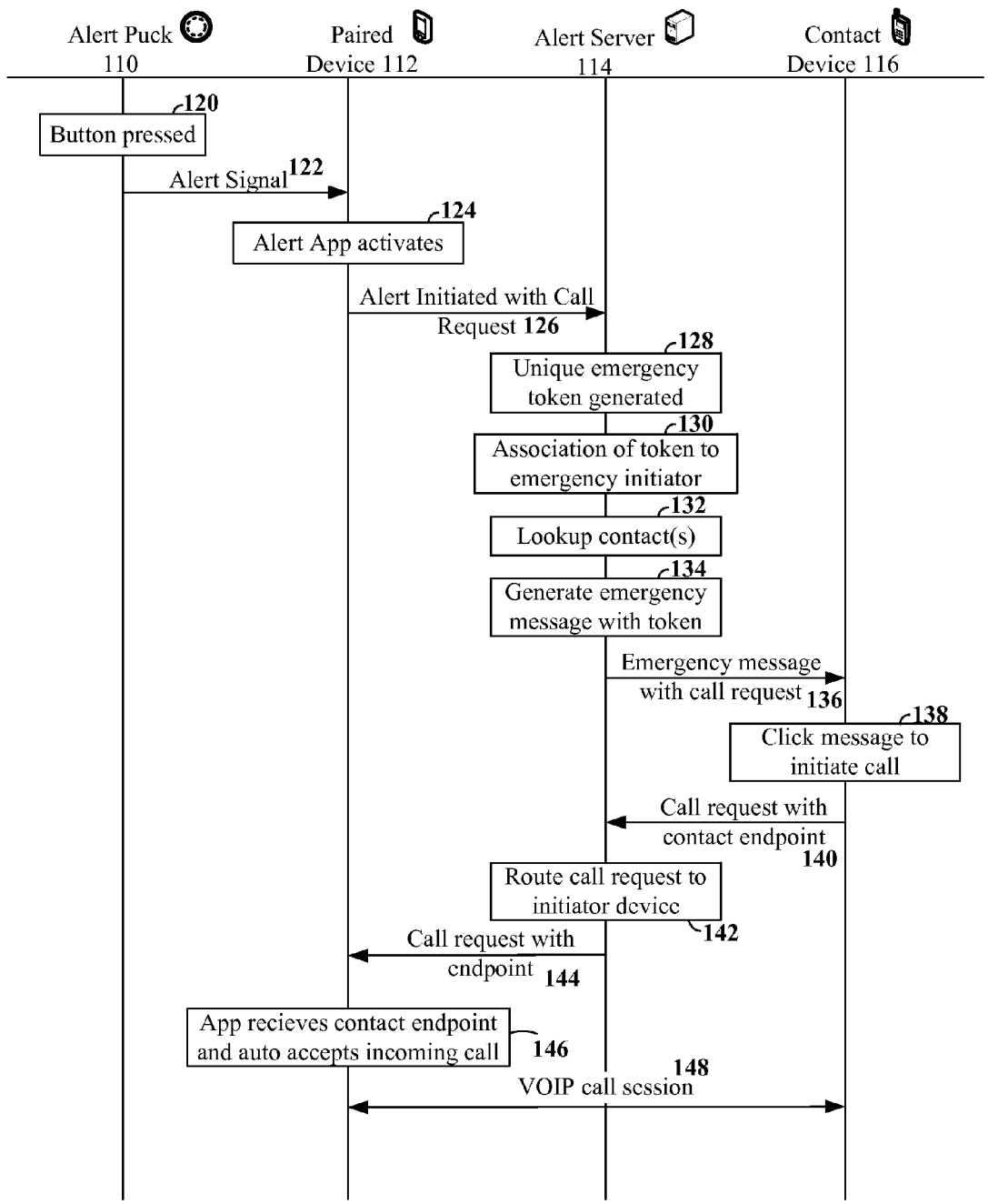
FIG. 1 shows a flow diagram for an alerting system with callback in accordance with embodiments of the disclosure.

Embodiments of the disclosure are directed towards an alert puck and a system within which the alert puck operates. The alert puck is a small, self-powered device that includes a processor, a button, a gyroscope/accelerometer, and a wireless transceiver. Movement of the alert puck can be detected and alerts regarding the movement conveyed via the wireless transceiver. In one embodiment, the alert puck includes a button for changing device functions and/or for triggering an alert. The alert puck may be a standardized device able to be integrated into a plurality of different objects of daily use.

Client devices, such as smart phones and touch-tablets can provide user interfaces for interacting with the alert puck. Different applications may set different functions depending on specific use cases that involve the alert puck. For example, a wearable alert puck may be used to detect a wearer's wellbeing and to trigger a remote alert when the user falls and/or presses a button. Software providing a user interface for configuring contacts and actions to be taken when the button is pressed and/or a wear falls may execute on the smart phones and/or touch tablets. In one embodiment, the alert puck can vibrate, sound an alert, and/or blink (via LED lights) to remind a user of a preset event. For example, if the alert puck is mated to a pill box, the alert may be a reminder that it is time for the user to take a pill. Additional information about the alert can be presented on the companion mobile device (smart phone/tablet/computer). One or more remote servers may be connected to the client-device, which provide a software engine for settings, notifications, and rules affecting alert puck behavior. These rules can be adapted for specific use-cases and can be tailored with end-user or situational specific manners.

In one embodiment, a user can press an alert puck to indicate an emergency. A signal from the puck is sent to a paired device running an alert application. The alert application can signal an alert server, which may open or reserve a VOIP communication endpoint with the application. The alert server generates an emergency token, associates this token with the alert app, and conveys emergency message to a set of predefined contact devices. Upon receiving these messages, a response can be initiated, which connects the contact device with the alert server. The alert server can route/direct the communication to the open endpoint of the alert application, which allows the contact device to communicate with the paired device (more specifically the alert application running on the paired device) over VOIP. The above scenario details one contemplated use of a system that includes the alert puck, the paired device (with alert application running) and alert server. The system is standardized and flexible so that a variety of functionalities are able to be implemented by the described hardware, where significant differences are realizable via changes in software-based functionality.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning to the Figures, FIG. 1 shows a flow diagram for an alerting system with callback in accordance with embodiments of the disclosure. The alerting system represents one contemplated use case of an alert puck system, which includes an alert puck 110, a paired device 112 running an alert application, and an alert server 114. Additional devices, such as contact device 116 are involved in specific use cases. The flow diagram illustrates one of many contemplated use cases and scenarios which leverage the hardware capabilities of the alert puck system. Software changes may be implemented in applications running on the paired device 112 and within the alert server 114, which provide significantly different situational usages of the underlying hardware, such as detailed in FIG. 5. Thus, the alert puck system is a highly flexible one able to be leveraged in a myriad of contemplated ways, as shall be detailed herein.

The alerting system of FIG. 1 represents a system where pressing upon a button of an alert puck 110 ultimately resolves in an emergency message being conveyed to contacts of the emergency initiator. As shown, the alert puck can receive a button press 120. The alert puck 110 may have been previously paired to a nearby device 112, which is wirelessly connected via a personal area network (PAN). If no existing pairing exists, a pairing can be initiated by the button having been pressed. Assuming a paired device 112 is communicatively linked to the alert puck, an alert signal 122 is conveyed over this wireless link. Upon receipt of the signal 122, an alert application running on the paired device 112 activates, as shown by step 124. Activation results in a data communication connection being established between the paired device 112 and the alert server 114. An alert is initiated by a data message conveyed over this communication link, as shown by request 126 being conveyed from device 112 to server 114. In one embodiment, this communication can be a SIP based channel, a VOIP channel. These channels may be partially pre-established to expedite voice sessions with one or more of the contact devices 116. In another embodiment, endpoint information (such as an IP address) can be conveyed from the paired device 112 to the alert server 114 at this stage to facilitate establishments of a subsequent voice communication.

The paired device 112 may be placed in an operating system that inhibits activity from interfering with an anticipated communication channel being established. For example, some computing devices 112 may have multiple transceivers, where only one transceiver is able to be activated at a time. In such a case, an antagonistic (to VOIP call establishment) transceiver can be locked for a duration of time to ensure an attempted communication back to the paired device 112 is not blocked during a time of an emergency. The alert application running on the paired device 112 can handle specifics that facilitate the device's (device 112) participation in the alert system. Upon receiving an alert signal, the paired device 112 initiates calls and/or packet messages to one or more contact devices 116.

Upon receipt of the request 126, the alert server 114 can generate a unique emergency token 128. In step 130, the alert server 114 can associate the token to one or more devices of the emergency initiator (the owner/wearer of the alert puck 110), which were previously established for the initiator. That is, by default, communications for the emergency can be established with the paired device 112, but one or more additional contact points for the initiator may be established. For example, one contact point may be for a caregiver or neighbor geographically proximate to the initiator. Thus, embodiments contemplate configurable flexibility to ensure contact is established during an emergency. These are all rules and procedures able to be programmed into the alert server 114 and/or paired device 112 in contemplated embodiments.

In step 142, the alert server 114 can look up a set of contacts which were designated previously as emergency contacts. In step 134 an emergency message can be generated, which includes a reference to the emergency token, which was uniquely generated for the emergency. That is, if the button of alert puck 110 was pressed a significant period later, a different emergency token would result for the subsequent emergency than for the present one. The emergency message may be a preconfigured message, may include information conveyed from the alert application, and/or may be customized by the paired device 112 and/or server 114 for a specific contact to facilitate a rapid and appropriate emergency response. For each contact (one or more may be specified by the server 114 even though the flow chart only shows one for simplicity of expression), an emergency request message 136 is conveyed. This message 136 may include a call request (to communicate with the initiator or the paired device). A user of the contact device 116 is notified of the emergency, such as through a voice message or a text based GUI popup. Selecting this message can immediately initiate a voice session (a VOIP session for example) with the paired device 112 and the emergency initiator. The server 114 facilitates communication establishment of the VOIP session.

In one embodiment, a call request 140 is conveyed from the contact device 116 to the alert server 114 responsive to clicking (or otherwise selecting) the emergency message. The request 140 includes contact endpoint information for the contact device4 116. The alert server 114 routes (established endpoints of a SIP based call between the contact device 116 and the paired device 112) the request to the initiator device. The call request with suitable endpoint is conveyed in step 144 from the server to the paired device 112. The alert application running on the device 112 receives the endpoint information from server 114 and auto accepts the incoming call, as shown by step 146. A VOIP call session is established in step 148 between device 112 and device 116.

Appreciatively, the recipient of the emergency message (using contact device 116) need not look up any phone numbers. The initial communication is with the alert server 114, which connects the device 116 to the paired device 112 using the emergency token. In situations where multiple contact devices are sent emergency messages, a first responding device 116 can be connected to paired device 112 by the alert server 114. The alert server 114 sends text messages to other contact devices 116 notifying them that one of the responders has responded, in one embodiment. In another embodiment, the alert server 114 can join additional contacts into the VOIP call session. Rules may mute the line of subsequent callers, to minimize distractions in one embodiment. In still another embodiment, voice communications can be translated into text, which is recorded and conveyed to the paired device 112, the contact device (s) 116, and/or one or more additional emergency responders. The alert server 114 may save a transcription of the VOIP call session (for the emergency) in one contemplated embodiment. This textual translation may be optionally secured and/or analyzed by the alert server 114 in one embodiment. Analyzed content indicating that emergency responders need to quickly be alerted, may result in the alert server 114 contacting suitable responders (police, EMT, etc.) in some contemplated implementations. Thus, functionality of the alert server 114 can be highly tailored for a situation and to ensure rapid and measured responses are rapidly implemented.

In embodiments, alternative communication options may be present and activated should no paired device be within range. For example, the alert puck 110 may include a second wireless transceiver able to connect to a local area network or a mobile telephony network to directly communicate with an alert server 114 in instances where no pair-able device is present within a PAN range. To illustrate, the paired device 112 can be an alert puck wearer's mobile phone, but the wearer may not be able to retrieve the phone to participate in a voice session, due to the nature of the emergency. In such a situation, back-up or alternative contact points proximate to the initiator may be discovered (by the alert server 114) and communications between device 116 and this alternative contact point (device) may be established. Hence, in embodiments, the flexibility afforded by integrating the alert server 114 in call establishment and/or emergency response facilitation greatly exceeds that of other conventional solutions (such as attempting direct communications between paired device 112 and contact device 116 without alert server 114 participation/involvement).

Additionally, use of the alert application running on the paired device 112 is highly advantageous, as it is a platform agnostic solution. Regardless of which device operating system, platform, connection specifics, and other factors, so long as an alert application is able to run on the paired device 112, the alert server 114 is able to establish the VOIP call session 148. In embodiments, the alert server 114 may be able to communicate directly with the alert puck 110 and/or with devices lacking the alert application, although such solutions may sacrifice some of the features that are present when the alert application is available.

Figure 2A:
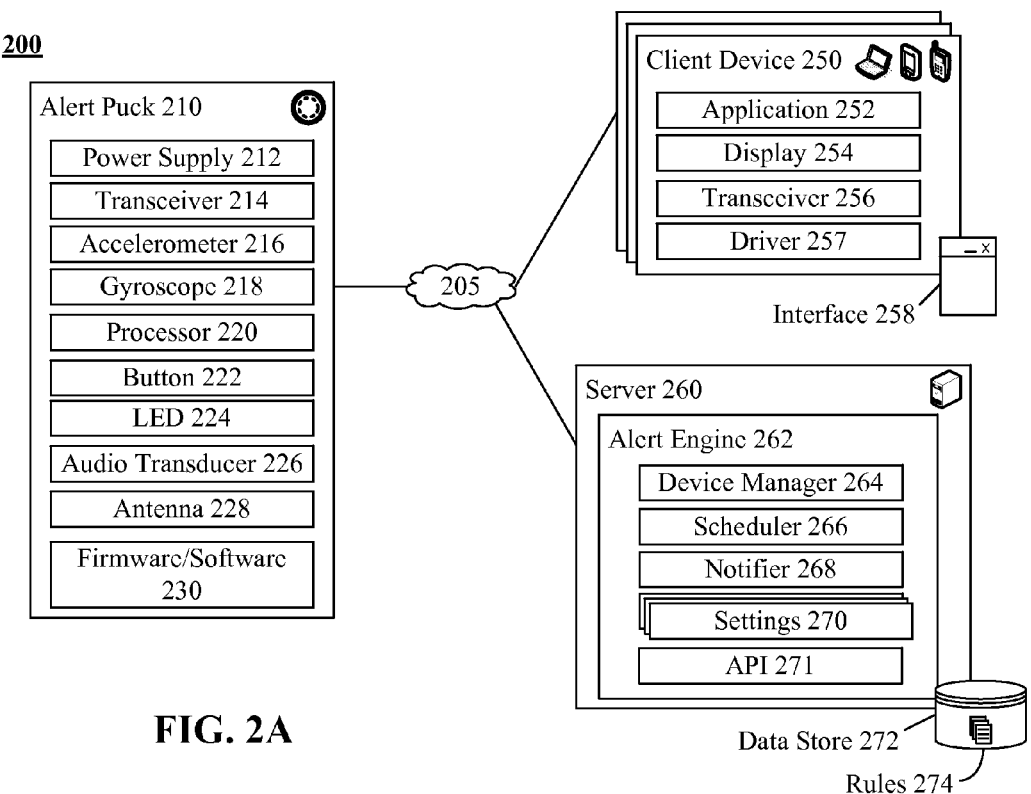
FIG. 2A is a schematic diagram illustrating a system for a low power wireless enabled alert puck in accordance with an embodiment of the inventive arrangements disclosed herein.

FIG. 2A is a schematic diagram illustrating a system 200 for a low power wireless enabled alert puck 210 in accordance with an embodiment of the inventive arrangements disclosed herein. In system 200, a network 205 communicatively links air puck 210, client device 250, and server 260 permitting exchanges of data between these devices. The client device 250 can execute one or more applications 252, which provide a user interface 258 for the display 254, which interoperate with the alert puck 210. Server 260 can include alert engine 262 and a set of alert rules 274 for the alert puck 210.

In one embodiment, a driver 257, which is a computer program that operates or controls the alert puck 210 when paired to device 250, is used to enable an operating system of device 250 to access hardware functions of the alert puck 210. Use of device driver 257 can be advantageous for permitting the alert puck 210 to be used across multiple different operating systems (such as ANDROID and iOS) and can establish standard interface mechanisms for applications 252 to access puck 210 functionality. Thus, driver 257 can abstract hardware specifics of the alert puck 210 while permitting use of its functions by application 252.

In one embodiment, an application program interface (API) 271 can be established for the server 260, where the API 271 establishes a set of functions or routines to accomplish specific tasks or that are allowed to interact with the alert engine 262. The API serves as a level of abstraction, which facilitates standards based communications and interoperability among distributed components. The API 271 may be implemented in numerous contemplated ways and in accordance with a myriad of standards, such as a POSIX standard, a JAVA API, a Web API, and the like. API 271 can be related to a software library that describes and prescribes the expected behavior of the library, while the library is the actual implementation of a set of rules. The API 271 can also be implemented as a protocol, such as remote method invocation protocol. In embodiments, the API 271 can be alternatively implemented as an application binary interface (ABI).

The alert puck 210 is a stand-alone, low power device able to be integrated into any number of objects. The alert puck 210 may be self-contained having basic interface mechanisms, such as a button 222, which an end-user can push, a set of zero or more LED lights 224, and an audio transducer 226. Pressing the button 222 can activate/deactivate the puck 210, can change a state of the puck 210, can test the puck 210, can send a message or signal from the device via the wireless transceiver 214, can turn on/off an alert, and the like. The LED 224 lights can be multi-colored, such as red, glue, and green. Different blink sequences can be selectively activated in different colors. The audio transducer 226 can be implemented as a buzzer, a speaker, or a microphone in different embodiments. Additional input/output mechanisms (not shown), such as a vibration component or a display, are contemplated for some embodiments of the disclosure.

Alert puck 210 includes one or more environmental sensors, such as accelerometer 216 or gyroscope 218 for sensing motion. The sensing of motion through these sensors can alter a power-state, can increase/decrease a transmission or processing cycle of the puck 210, or can be used to detect one or more events. Different motion profiles can be linked to different ones of the environmental sensors. These profiles may be saved within settings 270 of server 260 and used to program/update the firmware/software 230 of the alert puck 210. Additional environmental sensors, such as a pressure sensor, a moisture sensor, a temperature sensor, a tilt sensor, a light sensor, and the like, are contemplated for the alert puck 210. In embodiments, one or more of the alert puck 210 sensors are microelectromechanical systems (MEMS) sensors.

Alert puck 210 includes a transceiver 214, power supply 212 (e.g., battery), antenna 228, and firmware/software 230 that include program instructions that the processor 220 executes. The puck 210 is shown as being a circular device (see FIG. 2) in embodiments, but the disclosure is not so limited and other arrangements and shapes are contemplated.

Server 260 can be a hardware/software element having a data store 272 and an alert engine 262, which includes a device manager 264, a scheduler 266, a notifier 268, a set of settings 270, and/or other such modules. Alert engine 262 assists in functions of a set of one or more alert pucks 210. Alert engine 320 functionality can include, but is not limited to, diagnostic functionality, registration functioning, message conveyance functions, communication functions, buffering functions, detection functions, status querying functions, and the like.

Device manager 264 manages one or more client devices 250, alert pucks 210, and the like. Manager 264 functionality can include, but is not limited to, puck 210 profile management, client device 250 pairing management, and the like. In one instance, manager 264 can be utilized to determine device 250 or alert puck 210 state. In the instance, manager 264 can utilize state information to convey notifications to client device 250 or to alert puck 260. For example, if alert puck 210 is off, a notification typically conveyed via the puck 210 can be conveyed to a secondary device, such as a registered client device 250 instead. Scheduler 266 can trigger alerts and/or functions of alert puck 210. Scheduler 266 can track time and can trigger changes in function state, function operation, and/or alerts based on scheduled time. Scheduler 266 functionality can include, but is not limited to, schedule acquisition, schedule parsing, and the like.

Notifier 268 can manage notifications between puck 210, client device(s) 250, and/or server 260. Notifier 268 functionality can include, but is not limited to, store and forward capabilities, buffering capabilities, notification delivery, and the like. In one embodiment, notifier 268 can receive one or more events detected by device 250 and/or alert puck 210. In one embodiment, notifier 268 can be used to set notification tones, notification timers, and the like. In the embodiment, notifier 268 can include an interface (e.g., a Web based interface able to be displayed in a client-side browser, such as interface 258) for selecting one or more tones to emit from transducer 226 when an event is determined.

Settings 270 can be one or more rule sets for establishing the behavior of server 260, engine 262, and/or system 200. Settings 270 can include, but is not limited to, manager 264 options, scheduler 266 settings, notifier 268 parameters, and the like. In one instance, settings 270 can include security policy options, rules 274, and the like. Setting 270 can be manually and/or automatically determined. In one instance, settings 270 can be configured via interface 258 and/or another interface communicatively linked to server 260.

Data store 272 can be a hardware/software component able to persist rules 274, puck records, and the like. Data store 272 can be a Storage Area Network (SAN), Network Attached Storage (NAS), and the like. Data store 272 can conform to a relational database management system (RDBMS), object oriented database management system (OODBMS), and the like. Data store 272 can be communicatively linked to server 260 in one or more traditional and/or proprietary mechanisms. In one instance, data store 272 can be a component of Structured Query Language (SQL) complaint database.

Rules 274 can be one or more programmatic directives for controlling system 260, device 250, application 252, alert puck 210, and the like. In one instance, rules 274 can include, but is not limited to, device 250 or puck 210 identifiers, user identifiers, programmatic actions, and the like. In one embodiment, rules 274 can be utilized to execute customized responses to different scenarios.

Client device 250 can be a smart phone, a touch-tablet, a notebook computer, a desktop computer, a gaming console, a media player, and the like. Device 250 can include, but is not limited to, input/output components, user settings, interface 258, display 254, transceiver 256, and the like. In one instance, application 252 can be an agent program of an engine 262. In one embodiment, engine 262 functionality can be present within application 252. Interface 258 can be a user interactive component permitting interaction and/or presentation of rules 274, puck 210 information, and the like. Interface 258 can be present within the context of a Web browser application, a desktop application, and the like. Interface 258 capabilities can include a graphical user interface (GUI), voice user interface (VUI), mixed-mode interface, and the like.

Network 205 can be an electrical and/or computer network connecting one or more system 200 components. Network 205 can include, but is not limited to, twisted pair cabling, optical fiber, coaxial cable, and the like. Network 205 can include any combination of wired and/or wireless components. Network 205 topologies can include, but is not limited to, bus, star, mesh, and the like. Network 205 types can include, but is not limited to, Local Area Network (LAN), Wide Area Network (WAN), Virtual Private Network (VPN) and the like.

Figure 2B:
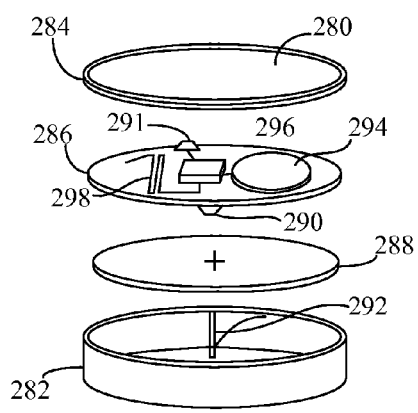
FIG. 2B is an exploded view of a puck device, which represents one contemplated configuration of alert puck, in accordance with some embodiments.

FIG. 2B is an exploded view of a puck device, which represents one contemplated configuration of alert puck 210, in accordance with some embodiments. The puck device can include a housing 282 into which is disposed a battery 288, and a circuit board 286. A top or cover 284 covers and seals the puck device. The circuit board 286 includes a positive battery contact 290 for connecting to the positive side of the battery 288. A negative contact 292 makes contact with the negative side of the battery and provides a ground to the circuit board 286. The circuit board includes a transducer 294, and circuitry 296. The circuitry 296 can be, for example, an integrated circuit that includes the control circuitry, accelerometer, driver circuit, and transceiver. The circuit board can also include an antenna element 298 for transmitting and receiving radio frequency signals via the transceiver. The cover 284 can include a button actuator 280 that can be used to actuate a switch element 291 on the circuit board 286. The battery 288 can be, for example, a coin cell, such as those sold by under the designation CR2032. The transducer 294 can be a piezo element that is rigidly mounted to the circuit board 296, and the circuit board 296 can be rigidly mounted in the housing 282. Thus, vibrations of the transducer 294 are propagated through the circuit board and into the housing. In some embodiments the transducer 294 can be mounted directly on the housing 282, and driven through electrical contacts disposed on the circuit board that make electrical connection to the transducer terminals. The configuration of the circuit board 286, housing 282, battery 288, and cover 284 result in a system having a resonant frequency, meaning a frequency at which the greatest vibrational amplitude occurs, which can be substantially different than the resonant frequency of the transducer element 294. Accordingly, rather than driving the transducer 294 at its resonant frequency, it can be driven at the resonant frequency of the assembled puck device.

Figure 3:
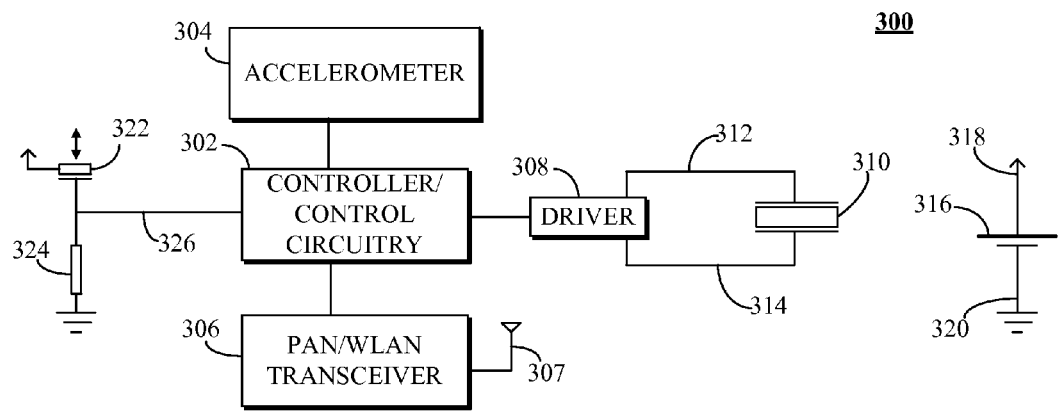
FIG. 3 is a block schematic diagram of an alert puck having a selectable alert volume in accordance with some embodiments.

FIG. 3 is a block schematic diagram of an alert puck 300 having a selectable alert volume in accordance with some embodiments. The alert device 300 is configured in a wearable configuration, and includes a controller or control circuitry 302 that control operation of the alert device 300. The control circuitry 302 can include a microcontroller or microprocessor, and memory. The memory can include read only memory (ROM) as well as random access memory (RAM). The ROM can include instruction code that is executed by the controller or processor, while the RAM can be used to store values, settings, and other data to be used by the instruction code when being executed. The control circuitry 302 can also receive input from other circuits, such as, for example, an accelerometer 304. The accelerometer 304 can, in some embodiments, provide an indication of an acceleration event such as would be consistent with the user falling, for example. The accelerometer 304 can be configured, for example, to provide an interrupt to the control circuit 302 in the event of a high acceleration event. In some embodiments, the accelerometer 304 can provide three dimensional acceleration information, allowing the control circuit 302 to determine it orientation, as well as movement, as is known.

The control circuitry 302 is further coupled to a wireless transceiver 306, which can be a personal area network (PAN) transceiver or a wireless local area network (WLAN) transceiver. An example of a PAN transceiver is a transceiver that operates in conformance with a standard according to the Institute of Electrical and Electronics Engineers (IEEE) standard 802.15. An example of a WLAN transceiver is a transceiver that operates in conformance with a standard according to IEEE standard 802.11. The transceiver 306 includes radio circuitry for communicating over an antenna 307 so that it can both transmit and receive radio frequency signals. In some embodiments, where the transceiver 306 is a PAN transceiver, the PAN transceiver can pair with another device, such as a mobile communication device. Thus, in some embodiments for example, in response to an acceleration event as indicated by the accelerometer, the control circuit 302 can control the transceiver 306 to send an alert message to another device indicating the occurrence of the acceleration event. At the same time, the control circuitry can let the user of the alert device 300 know that the acceleration event has been detected via a tactile alert. In some embodiments the tactile alert can be given first, before transmitting an alert message, to give the user an opportunity to respond so as to indicate that the alert does not need to be transmitted (i.e. it was not an emergency).

The tactile alert is provided by a driver circuit 308 which drives a vibrational transducer 310. The vibrational transducer 310 can be, for example, a piezo element. The driver circuit 308 can, responsive to the control or enable signal from the control circuitry 302, provide different drive signals to the transducer 310. For example, on line 312 the driver circuit 308 can provide a clock signal, which is essentially a square wave that can be generated by circuitry in the control circuitry 302. On line 314 the driver circuit can provide a ground to achieve a low volume vibration of the transducer 310, or an inverted clock signal that is an inverted version of the signal on line 312 to achieve a high volume vibration. By inverting the signal on line 312 on line 314, the alert device can achieve 6-9 decibels (dB) of volume increase over holding line 314 at the ground level. In addition to using different volume levels, the control circuitry 302 can cause the driver circuit 308 to drive the transducer 310 in various patterns of off, low, and high volume. Different patterns can be assigned to different applications so that the user can determine the nature of an alert by perceiving the pattern. In some embodiments the volume of the vibration can be selected, such as by use of a button 322 on the alert device 300. The button 322 can be pressed to connect a voltage level to a button input line 326. When the button is not pressed a pull down resistor 324 can keep the button input line 326 low. In some embodiments, in addition to selecting a volume level for the transducer 310, the button can be used to respond to alerts (i.e. to stop an alert). In some embodiments, pressing the button 322 can generate an alert event, causing the alert device to transmit an alert message via the transceiver. The voltage can be supplied by a battery 316 that provides a battery voltage 318 and ground 320 for the button 322 as well as the other circuitry of the alert device 300.

Accordingly, the alert device can, for example, receive a message via the transceiver 306, and in response, generate a vibration via the transducer 310 to alert the wearer. In some embodiments the alert can be a simple vibration of a predetermined duration, at either the low or high volume setting, as selected by the user/wearer. In some embodiments the vibration of the transducer can be patterned (i.e. variations of off/low/high volume) based on information in a message received via the transducer to indicate a type of alert. In some embodiments the button 322 can be pressed to indicate acknowledgement of the alert (which can also prompt the alert device 300 to transmit an acknowledgement via the transceiver to the device that sent the alert message). In some embodiments the button 322 can be pressed momentarily to toggle the transducer volume, and held down in order to generate an alert that is transmitted by the alert device 300 via the transceiver 306.

The alert device 300 can be sealed, such that all of the components shown in FIG. 3 are within a housing, where the button 322 is actuated by a member on the outside of the housing, or that forms part of the housing. The housing can be opened so as to replace the battery 316. Being sealed, there are no acoustic ports, and the air volume inside the alert device 300, once closed, is substantially isolated from the ambient air. In some embodiments, the transducer itself can have a resonant frequency that is substantially different than that of the alert device 300 when the components and battery 316 are mounted inside the alert device 300, and the drive or clock signal used to drive the transducer 310 can be at the resonant frequency of the alert device 300 as assembled, rather than at the resonant frequency of the transducer 310. It will be appreciated by those skilled in the art that, by using a piezo element for the transducer 310, as opposed to a conventional vibrator comprising a motor and eccentric weight, less power is drawn from the battery 316 to generate alert vibrations. Thus, the battery 316 can be, for example, a small coin cell which can last for a year or long in some embodiments.

Figure 4:
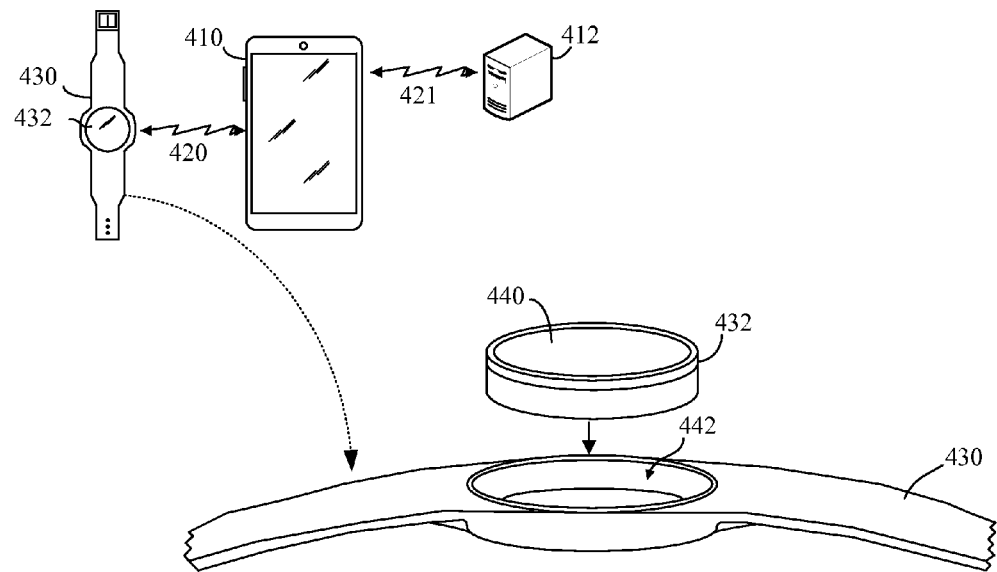
FIG. 4 is a system diagram of a wearable alert device paired with a mobile communication device in communication with a server in accordance with some embodiments.

FIG. 4 is a system diagram 400 of a wearable alert device 430 paired with a mobile communication device 410 in communication with a server 412 in accordance with some embodiments. The wearable alert device 430 is in the form of a wrist strap having a pocket in which a puck device 432 is disposed. The puck device 432 can be substantially similar to that shown in FIG. 1 or FIG. 2. The mobile communication device 410 can pair with the wearable alert device 430 using a personal area network radio link 420. The mobile communication device 410 can run one or more applications that can interact with, and/or respond to the wearable alert device 430 over the radio link 420. Network communication link 421 can connect mobile communication device 410 to a remotely located server 412, which may include functionality described for server 160 in FIG. 1.

For example, the user of the wearable alert device 430 can press and hold a button on the puck device 432, thereby generating an alert event, which prompts the puck device 430 to transmit an alert to the mobile communication device 410. In response, an application that is instantiated on the mobile communication device 410 can take some predetermined action (i.e. send a message, make a call, etc.). The action may include communicating with server 412, which either takes a predetermined action or causes another device, which may include device 410, to perform an action. In another example, the mobile communication device 410 can experience an event, such as, for example, receiving a phone call. In response, the mobile communication device 410 can transmit an alert message to the wearable alert device 430, and alert the user by vibrating at the selected volume level, or according to a defined pattern. The pattern, if used, can be specified in the alert message, and can correspond to, for example, a particular contact associated in the mobile communication device 410. An action may be initiated by the server 412, which communicates over a wide area network to mobile device 410, which communicates over a personal area network with the wearable alert device 430.

In one embodiment, the wrist strap of device 430 can be configured to be worn by a user on the user's wrist, like a wristwatch or bracelet. The puck device 432 can fit within a pocket 442 formed in the wrist strap. The wrist strap can be formed of a compliant material such as, for example, rubber, and the pocket 442 can be sized to retain the puck device 432 by friction. Ridges or other retaining features can be used to retain the puck device 432 in the pocket 442 as well. The bottom of the puck device 432 can be exposed through the pocket, so as to make contact with the wearer's skin. The puck device 432 can have a button actuator 440 on the top surface of the puck device 432 to make it easy for the user to actuate the button, as needed.

Figure 5:
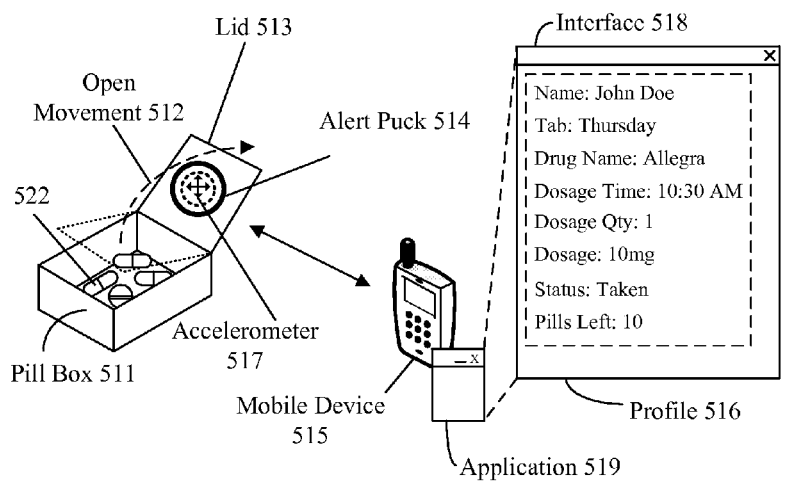
FIG. 5, which is a schematic diagram illustrating a set of scenarios for a low power wireless enabled smart pill box in accordance with embodiments.
Figure 5:
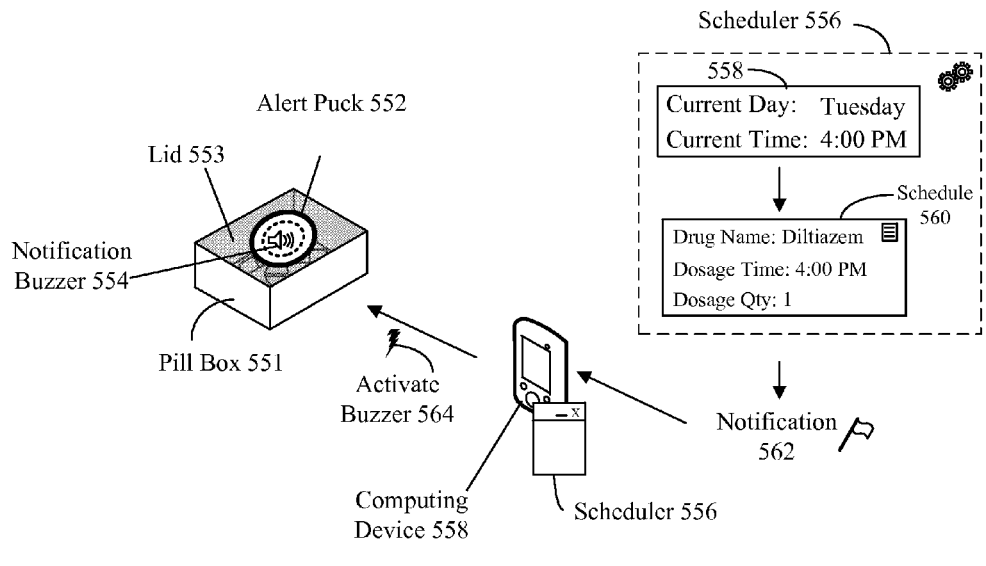

As noted in FIG. 1, the alert puck is able to be integrated into a plurality of different devices and scenarios, as is illustrated by FIG. 5, which is a schematic diagram illustrating a set of scenarios 510, 550 for a low power wireless enabled smart pill box in accordance with embodiments. In scenario 510, the alert puck 514, 552, which is a low power Bluetooth device, can enable a pill box 511, 551 to assist in regular medication consumption. For example, the alert puck 552 can include an ultra-low power component which can notify a user or caregiver when a medication refill is necessary in response to opening and closing the pill box (e.g., corresponding to normal medication consumption behavior).

As used herein, Bluetooth can be a wireless technology standard for exchanging data over short distances (e.g., using short-wavelength UHF radio waves in the ISM band from 2.4 to 2.485 GHz) from fixed and mobile devices and building personal area networks (PANs). Bluetooth can be a standard wire-replacement communications protocol primarily designed for low power consumption, with a short range based on low-cost transceiver microchips in each device. Because the devices use a radio (e.g., broadcast) communications system, the devices do not have to be in visual line of sight of each other, however a quasi-optical wireless path must be viable. Range is power-class-dependent, but effective ranges vary in practice. The effective range varies due to propagation conditions, material coverage, production sample variations, antenna configurations and battery conditions.

Alert pucks 514, 552 can be paired to one or more devices (e.g., device 515, computing device 558) via traditional and/or proprietary means. Paired devices can utilize one or more Bluetooth profiles to communicate. These profiles can include settings to parameterize and to control the communication. Profiles can include, but is not limited to, alert and time profiles, health care profiles, and the like.

Bluetooth low energy, (Bluetooth LE, BLE) can provide considerably reduced power consumption and cost while maintaining a similar communication range of traditional Bluetooth. It should be appreciated that BLE peak current consumption is approximately <15 mA.

Accelerometer 517 can be a device which can measure proper acceleration within a reference frame. Accelerometer 517 can include motion sensing capabilities, orientation capabilities, and the like. Buzzer 554 can be an audio signaling device which can be piezoelectric. A piezoelectric element can be driven by an oscillating electronic circuit or other audio signal source, driven with a piezoelectric audio amplifier. It should be appreciated that the audio amplifier can be omitted.

As used herein, a pill box (e.g., a pill organizer, pill container) can be a special container for storing scheduled doses of medications. Pill boxes shapes include square-, cylindrical, and rectangular (e.g., pen-shaped). Pill box can include multiple sections (e.g., compartments) for different times of the day and/or different days. For example, pill box 511, 551 can include seven rectangular shaped compartments, each compartment having an abbreviated labeled for each day of the week (e.g., S, M, T, W, T, F, S) on each compartment lid.

A pill 522 can include a solid pharmaceutical oral dosage form of medication. Pill 522 can include, but is not limited to, tablets, capsules, and the like. Pill 522 can include over the counter (OTC) medication, prescription medication, food supplements, and the like. The disclosure can permit pill box 511, 551 to be enhanced to enable medication monitoring and medication prompting (e.g., reminder functionality). For example, the disclosure can utilize buzzer 554 to alert a user a medication has already been taken, the medication needs to be taken, and to recommend refills to be ordered.

In one embodiment, the disclosure can leverage proximate companion devices such as user owned devices, health care devices, and the like. In the embodiment, puck 514, 552 can be paired to a mobile phone (e.g., 515, 558) which can communicate with puck 514, 552 to coordinate notifications (e.g., when buzzer 554 can be triggered). In another embodiment, alert puck 514, 552 can communicate with one or more remote servers such as health care provider servers, health care monitoring servers, and the like. In the embodiment, servers can orchestrate notifications based on historic activity, medical records, and the like. For example, the disclosure can be communicatively linked with a doctor's office's computer system to permit a doctor to determine which medication was taken by a patient who is suffering from side effects from a recently ingested medication.

In scenario 510, a pill box 511 can include a lid 513 with a low power Bluetooth device (alert puck) embedded within the lid 513. The alert puck 514 can include an accelerometer 517 which can detect an open (e.g., or closed) movement 512 of lid 513. That is, the alert puck 514 can determine when a person is going to take medication from the pill box 511. In one instance, movement 512 can be classified based on one or more characteristics including, but not limited to, speed, direction, and the like. For example, when lid 513 is a hinge operated lid, movement associated with an approximate arcing motion around the axis of the hinge from a start point to an end point can be used to determine an opening and closing motion.

Upon detection of movement 512, puck 514 can notify a paired mobile device 515. Device 515 can execute an application 519 which can track medication consumption within a profile 516. In one instance, profile 516 can be presented within an interface 518 which can permit detailed information about medication consumption to be viewed. Profile 516 can include, but is not limited to, a name, a compartment identifier, a drug identifier (e.g., drug name), dosage time, dosage quantity, a dosage, a status, a medication counter, and the like. For example, medication counter can be incremented when a user fills the pill box and decremented each time a user consumes medication (e.g., the lid is opened and closed). It should be appreciated that the alert puck 514 can detect a closed movement and can be programmed to respond in an appropriate manner via one or more programmatic rules.

In scenario 550, a pill box 551 can include a lid 553 with a low power Bluetooth device (alert puck 552) embedded within the lid 553. The device (puck 552) can include an accelerometer and a buzzer 554 (e.g., peizo-electric speaker) which can emit one or more audible alerts. In one instance, a scheduler 556 executing within a computing device 558 can determine one or more notifications to be conveyed to puck 552. In the instance, scheduler 556 can trigger buzzer 554 to produce an audible alert when medication within box 551 is to be consumed. For example, scheduler 556 can utilize current day/time information to determine one or more medications to be taken from a schedule 560 and can convey a notification 562 to device 558. In the example, device 558 can transmit an activate buzzer 564 command which can cause buzzer 554 to emit an alert.

In one instance, buzzer 554 can be configured to generate one or more tones within one or more ranges. For example, buzzer 564 can generate a high pitch of 75 dB and low pitch of 69 dB. In the instance, double step generation can permit different tones such as 'low, hi', 'hi, low' or low, 'hi, low', and the like.

Since the Bluetooth device can determine when a lid is open (e.g., and consequently if a medication is consumed), the disclosure can be utilized in reinforcing appropriate medication consumption. For example, if a medication is schedule to be taken and it is not taken (e.g., lid opening is not detected), a notification can be conveyed to alert an appropriate entity (e.g., home health care giver).

It should be appreciated that accelerometer 517 can detect a range of movements can each detected movement can be associated with one or more rules. In one instance, the rules can be utilized to ignore accidental opening of a lid 513 by evaluating timing and/or movement thresholds. For example, if the lid 513 is left slightly ajar, the rule can be utilized to determine medication was not taken and updating of the medication counter can be suppressed.

Figure 6:
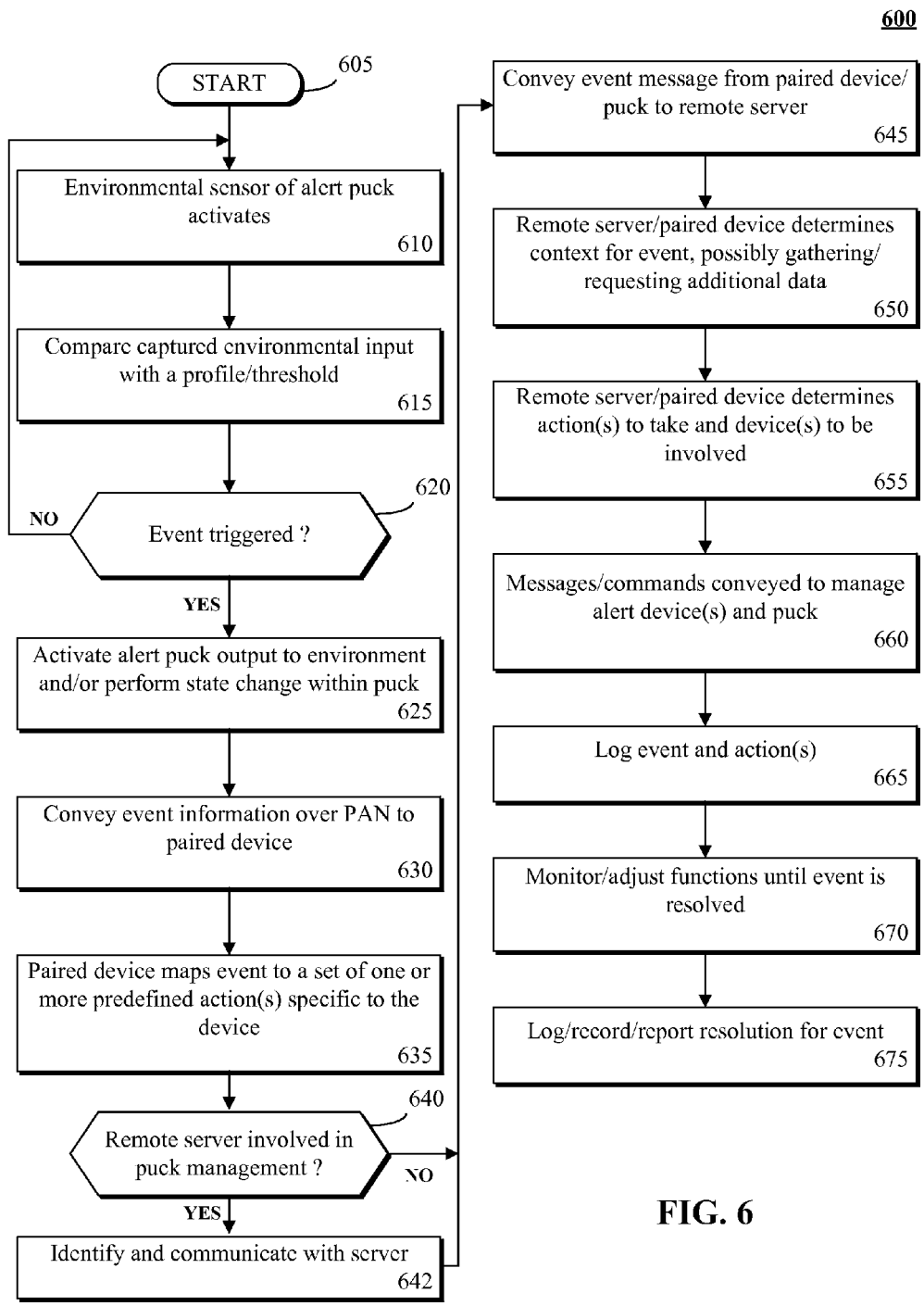
FIG. 6 is a flow chart of a process for an alert puck to trigger functions of remotely executing devices in accordance with embodiments of the disclosure.

FIG. 6 is a flow chart of a process 600 for an alert puck to trigger functions of remotely executing devices in accordance with embodiments of the disclosure. The process 600 starts 605 when an environmental sensor of the alert puck activates, as shown by step 610. The environmental sensor may include an accelerometer, a gyroscope, tilt sensor, or other sensor contained within the alert puck. In step 615, the captured environmental input from the sensor is compared against a previously established profile or threshold. The rules established against the conditional thresholds or by the profile(s) may or may not trigger an event, which is expressed in step 620.

When an event is triggered, step 625 executes. The alert puck may output to an environment, such as by audibly buzzing, flashing using a set of LED lights, and the like. The alert puck may also perform a state change action, such as turning on a wireless transceiver, waking a processor of the alert puck from a low-power hibernate state, turning the alert puck on, and the like. In step 630, event information can be conveyed from the alert puck over a personal area network (PAN) to a paired device, such as through a BLUETOOTH transceiver and protocol. Other protocols are contemplated in embodiments, such as wireless USB, ZIGBEE, Z-Wave, irDA, etc. Further, embodiments are contemplated where the alert puck directly communicates to a wireless network of greater range, such as a WIFI network, a cellular network, and the like. In step 635, a paired device can map the event to a set of one or more predefined actions specific to the device. For example, the device may be a smartphone or tablet running an application, which responds to alert puck signals/events in a customized/customizable manner.

A remote server may or may not be involved in alert puck management, which is expressed by step 640. If so, the server can be identified and communications with this server can be established, as shown by step 642. In step 645, an event message can be conveyed from the paired device/puck to the remote server or other device. In step 650, the remote server/paired device determines a context for the event. In embodiments, context determination involves gathering or requesting additional information from a Web based source, using environmental sensors remote from the puck, and the like. In step 655, the remote server/paired device determines a set of one or more actions to take in response to the puck input of step 610, which situationally are interpreted in a specific context per data driven rules. The actions can be taken by the server, by the paired device, by the puck, or by another device in communication with one of the above. In step 660, a set of messages or commands can be conveyed to manage the alert device(s) and the puck. In step 665, the event triggered and actions taken can be logged or recorded. In step 670, functions can execute to monitor or adjust for the event, which may be active until the event has been resolved. In step 675, the resolution of the event may be logged, recorded, and/or reported.

The environmental sensor of step 610, which is described as an automated one, may be replaced within the process with a manual input, such as a button press. This input may be associated with a characteristic event. Duration of a button press, a sequence of button presses, and the like can signify different events. Further, button presses may be interpreted in different manners depending on companion information received from an environmental sensor. Further, the puck may include a cache of environmental data, where a portion of this cached data may be conveyed when a button is pressed to help provide additional context with which to interpret the button being pressed.

Not all of the steps shown in FIG. 6 are necessarily performed in every instance and some are expected to be situationally skipped. The process 600 shows how a sensor on a puck detects an environmental event that triggers a function of a remotely executing application. Using the wearable wrist strap embodiment of FIG. 4, the alert puck can determine when a wearer is falling (using an accelerometer on the puck and comparing the acceleration against a falling profile). In response, an alert can be conveyed from the puck to a remotely executing application. This application can convey a message (to the wearer's phone and/or to the puck to receive input via a button that the wearer is unharmed) to a remote device. A response from that message can determine whether a caregiver or emergency responder is contacted on the wearer's behalf or not.

Figure 7:
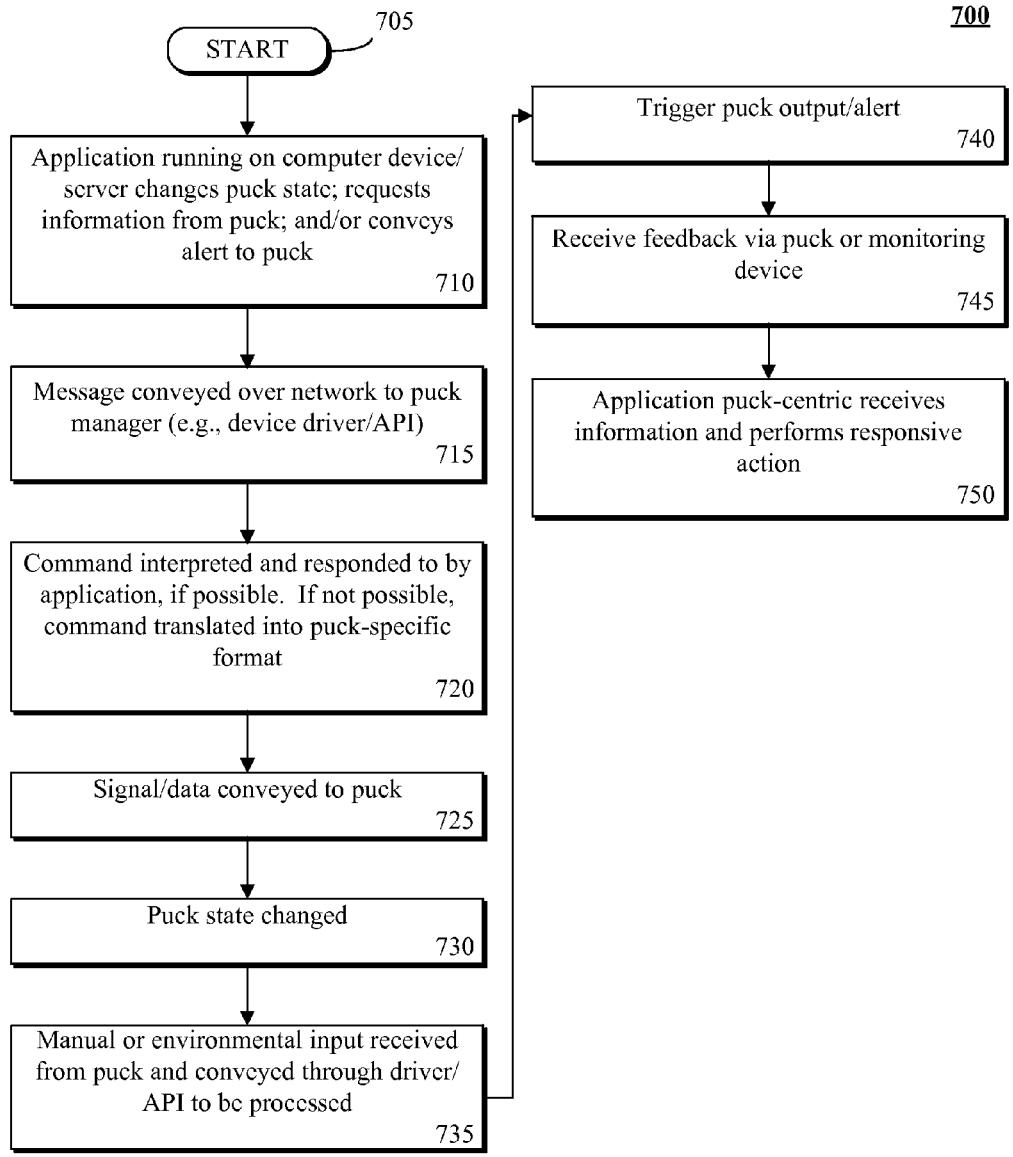
FIG. 7 shows a flow chart for a process for a computer device or server to include functions that communicate with an alert puck in accordance with embodiments of the disclosure.

FIG. 7 shows a flow chart for a process 700 for a computer device or server to include functions that communicate with an alert puck in accordance with embodiments of the disclosure. The process 700 starts 705 when an application running on a computer device or server changes puck state, requests information from an alert puck, and/or conveys an alert to a puck, as shown by step 710. In step 715, a message can be conveyed over the network to a puck manager. The puck manager may be a software engine running on the puck or on a companion device in communication with a puck. Device drivers and/or application program interfaces may be used to standardize communications and to facilitate machine-to-machine interactions through a defined interface standard.

In step 720, a command received from the application can be interpreted and responded to by the application, if possible. That is, in some instances, an application may maintain cached data from a puck, and may be able to respond to a command or request, such as a request for data, immediately, without having to contact the alert puck. Some commands, however, may require communication with the alert puck. This communication may be facilitated by an intermediate device, such as by a mobile phone linked to an internet, which is paired to an alert puck via a BLUETOOTH personal area network. In step 725, a signal or data can be conveyed to the alert puck. The puck state may change in response to the conveyed signal or data, as shown by step 730. In step 735, an input can be received from the alert puck, which is conveyed from the puck to a requesting device. The conveyed information may conform to device driver and/or API standards to facilitate information interchange. The input may be a user triggered input, such as a user pressing a button on the alert puck. The input may also be received from an environmental sensor, such as an accelerometer, gyroscope, or other in-puck sensor.

A puck output or alert can be triggered in step 740. For example, a buzzer on the puck can audibly sound, the puck can vibrate, and/or LEDs of the puck can flash or light. In step 745, feedback can be received from the puck and/or from a monitoring device external to the puck, but able to gather information geographically proximate to the puck. For example, a camera having the alert puck within its field of view can provide video or images as feedback to monitor the puck. In step 750, the application can receive puck-centric (from the puck or pertaining to the puck in some manner) information. One or more responsive actions can be performed.

Not all of the steps shown in FIG. 7 are necessarily performed in every instance and some are expected to be situationally skipped. The process 700 shows an externally executing application, which receives information from or provides information to the puck as part of its functionality. Using the pill box scenario of FIG. 5, the application can be a pill reminder one running on a smart phone. The alert puck on the pill box (or a message via the application) can trigger when it is time to take a medication. If the pill box is not opened responsively, more aggressive notifications/alert may be presented over time. The application can be alerted when the pill box was opened/closed (presumably to take medication), which can be an action taken as "feedback" after an alert was conveyed. This activity can be reported by the pill reminder application, which may responsively reset a timer for the next time a pill is to be taken.

Figure 8:
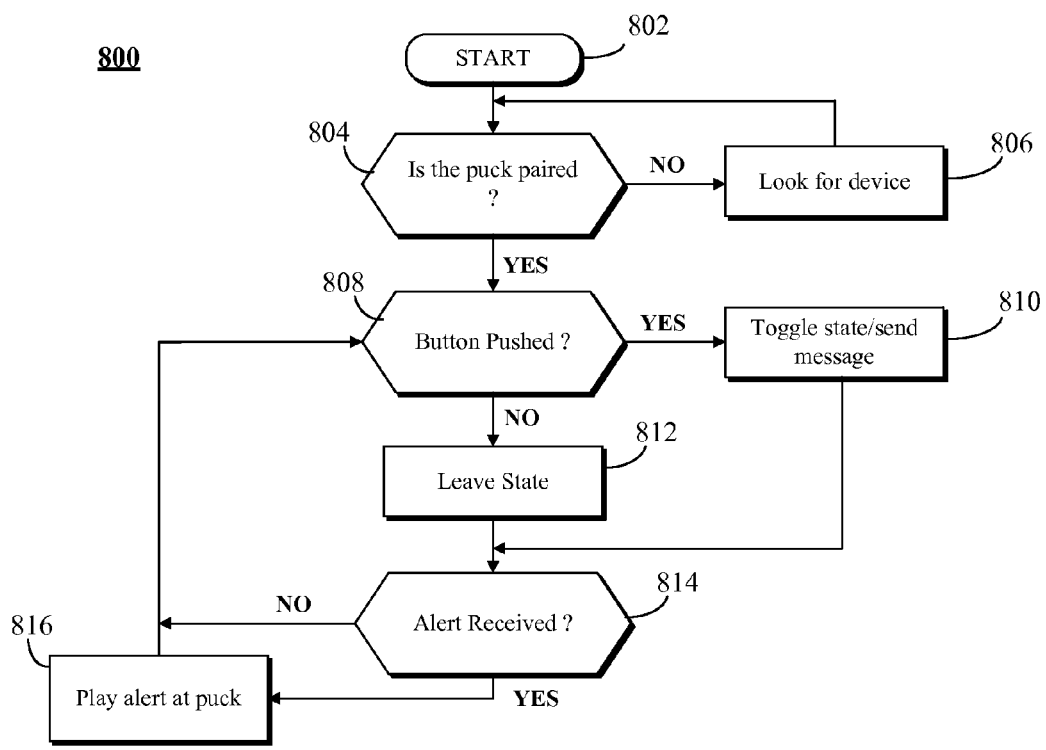
FIG. 8 is a flow chart diagram of a process for operating an alert device in accordance with some embodiments.

FIG. 8 is a flow chart diagram of a process 800 for operating an alert device in accordance with some embodiments. The method 600 illustrates one of many methods that can be used in an alert puck based scenario.

At the start 802, the alert puck is powered on, and a volume setting can be established, either a low volume level resulting from driving the transducer in single ended mode, or a high volume resulting from driving the transducer in double ended mode. The volume at the start can be determined from a saved volume setting or it can always start at a default setting. Volume is used as an example of a configurable setting having multiple states/settings. Other values can include whether LED lights are on/off, a rate at which information is sampled from a device sensor, and the like. In step 804 the process 800 can determine if the alert device is presently paired with another device, such as a mobile communication device (e.g. a "smart" cellular telephone device). If not, the process can loop through step 806 where it looks for a pairing, either to establish a pairing, or to find an established pairing. If, in step 804, the process 800 determines that the puck is presently paired with another device, the process can proceed to step 808 where the process 800 determines whether a user input is being received by the button being actuated. If the button is actuated, the process 800 can change a device setting, such as toggling a volume setting, as shown by step 810. By "toggle" it is mean that if the present setting in step 808 is low, then in step 810 it is changed to high. Likewise, if in step 808 a present volume setting is high, then in step 810 it is changed to low in one embodiment. In step 808 if the button is not actuated, the process can leave the puck state (which includes the volume setting) unchanged as indicated by step 812. In step 814 the process determines whether an alert has been received or generated. If an alert has been received in step 814, then in step 816 the process plays an alert in accordance with the puck settings. For example, the alert can present an audible buzzer at the selected volume level (i.e. either low or high). The alert can also cause the puck to vibrate, stop vibrating, to flash, or to change in some other user recognizable fashion. The process can then loop back to step 808.

It will be appreciated by those skilled in the art that the various steps of the process 800 can be modified. For example, step 814 can be the result of an interrupt, rather than always occurring after checking whether the button is actuated in step 808, for example, Similarly, various debounce timers and back off timers can be used so that, when actuation of the button is detected in step 808, it is toggled and then the button input can be ignored for a period of time after it is released so as not to allow switching noise to be read as a button actuation.

Accordingly, embodiments of the disclosure herein provide the benefit of an alert puck that is standardized, flexible, low-cost, easy to integrate into a myriad of physical objects and situations, and is reactively integrate into a distributed software platform. For example, situation specific profiles can be defined, which may be leveraged by applications running on smart devices. Network servers can situationally leverage input from the puck to perform a set of actions, and can alert a user or device by triggering output to the alert puck.

The alert puck provides a heretofore unknown cost effective means to extend network functions beyond the physical boundaries of machine. Instead of relying on custom hardware, standardized hardware can be manufactured at scale, which provides huge cost advantages. The alert puck can be environmentally sealed and may be reshaped/sized for different contemplated embodiments. Further, by using standardized and open components, like the alert puck, an open marketplace for software designed to leverage information from the environmentally aware puck is encouraged. For example, use of a standardized API at a server level can provide an easy means for smart phone application programmers to take advantage of alert puck functions and data. Further, a set of proximate devices can be managed as a group at a server, where input from multiple ones of these devices greatly increase an accuracy and fidelity of puck provided information.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

What is claimed is:

1. A system comprising:
an alert puck comprising a housing enclosing a sealed volume, a power supply disposed within the sealed volume, and control circuitry disposed in the sealed volume that includes a personal area network (PAN) interface for wirelessly receiving signals;
a communication device comprising an operating system, an alert application executing upon the operating system, and a wireless transceiver, wherein the wireless transceiver pairs with the personal area network interface of the alert puck; and
an alert server comprising an alert engine, wherein the system is configured to:
detect, at the alert puck, an actuation component of the alert puck being activated;
convey, from the alert puck to the alert application on the communication device, an alert signal over the PAN interface responsive to the actuation of the actuation component of the alert puck;
convey a message from the alert application of the communication device to the alert server;
generate a unique emergency token for an emergency at the alert server in response to receiving the message from the communication device at the alert server, wherein the alert server associates the emergency token with the communication device;
convey an emergency message including a reference to the emergency token from the alert server to one or more previously established contact devices;
responsive to the alert server receiving a response to one of the emergency messages from one of the contact devices, convey connection information from the alert server to the alert application; and
use the connection information to establish a voice over internet protocol (VOIP) session between the communication device and the contact device.

2. The system of claim 1, wherein the alert server conveys the emergency message to a plurality of contact devices, wherein only a first responding one of the contact devices is placed in the VOIP session, as facilitated by the alert server.

3. The system of claim 1, wherein different emergency tokens are generated each time an emergency is indicated by the actuation component of the alert puck.

4. The system of claim 1, wherein the alert server has an application program interface (API) for the alert puck, wherein the application program interface specifies a set of functions and routines provided by the alert server to the alert application.

5. The system of claim 1, wherein the communication device further comprises a device driver that enables the operating system to access functions of the alert puck.

6. The system of claim 1, wherein the alert puck further comprises one or more input/output elements comprising an audio transducer element, a LED element, or a vibration element.

7. The system of claim 1, wherein the alert puck is a component of a wearable device, wherein the alert puck comprises a button, which is the actuation component.

8. The system of claim 1, wherein the alert puck comprises an environmental sensor enclosed within the sealed volume for detecting movement of the alert puck within an environment, wherein the actuation component a component that determines a wearer of the alert puck has fallen or otherwise likely experienced a harmful motion, as automatically determined from movement detected by the environmental sensor.

9. A method comprising:
detecting an actuation component of an alert puck being activated, wherein the alert puck comprises a housing enclosing a sealed volume, a power supply disposed within the sealed volume, and control circuitry disposed in the sealed volume that includes a personal area network (PAN) interface for wirelessly receiving signals;
conveying an alert signal over the PAN interface responsive to being activated, wherein the alert signal is conveyed from the alert puck to an alert application running on a computing device, wherein the computing device comprises an operating system, the alert application executing upon the operating system, and a wireless transceiver, wherein the wireless transceiver pairs with the personal area network interface of the alert puck;
conveying a message from the alert application of the communication device to an alert server;
generating a unique emergency token for an emergency at the alert server in response to receiving the message from the communication device at the alert server, wherein the alert server associates the emergency token with the communication device;
conveying an emergency message including a reference to the emergency token from the alert server to one or more previously established contact devices;
responsive to the alert server receiving a response to one of the emergency messages from one of the contact devices, conveying connection information from the alert server to the alert application; and
using the connection information to establish a voice over internet protocol (VOIP) session between the communication device and the contact device.

10. The method of claim 9, wherein the alert server conveys the emergency message to a plurality of contact devices, wherein only a first responding one of the contact devices is placed in the VOIP session, as facilitated by the alert server.

11. The method of claim 9, wherein different emergency tokens are generated each time an emergency is indicated by the actuation component of the alert puck.

12. The method of claim 9, wherein the alert server has an application program interface (API) for the alert puck, wherein the application program interface specifies a set of functions and routines provided by the alert server to the alert application.

13. The method of claim 9, wherein the communication device further comprises a device driver that enables the operating system to access functions of the alert puck.

14. The method of claim 9, wherein the alert puck further comprises one or more input/output elements comprising an audio transducer element, a LED element, or a vibration element.

15. The method of claim 9, wherein the alert puck is a component of a wearable device, wherein the alert puck comprises a button, which is the actuation component.

16. The method of claim 9, wherein the alert puck comprises an environmental sensor enclosed within the sealed volume for detecting movement of the alert puck within an environment, wherein the actuation component a component that determines a wearer of the alert puck has fallen or otherwise likely experienced a harmful motion, as automatically determined from movement detected by the environmental sensor.

17. A computer program product comprising a non-transitory storage medium on which is stored computer program code, comprising:

computer program code for an alert application, stored on the non-transitory storage medium, for running on an operating system of a client device and associating the client device with an alert puck, wherein the alert puck comprises a housing enclosing a sealed volume, a power supply disposed within the sealed volume, and control circuitry disposed in the sealed volume that includes a personal area network (PAN) interface for wirelessly receiving signals;

wherein the computer program code for the alert application is configured, upon being performed on the client device, to:

detect an actuation component of the alert puck being activated by receiving an alert signal over the PAN interface that is transmitted by the alert puck to the alert application responsive to an actuation component of the alert puck being actuated;

convey a message from the alert application to an alert server in response to receiving the alert signal, wherein the message includes an endpoint identifier for establishing a voice over internet protocol (VOIP) session within an application session of established by computer program code for the alert application when performed by the client device;

wherein the alert server, responsive to receiving the message, generates an emergency token and associates the emergency token with the client device, the alert server subsequently transmits an emergency message to one or more predefined contact devices, wherein the emergency message references the emergency token, wherein one of the predefined contact devices responds to the emergency message, wherein the alert server, responsive to receiving the response from the of the predefined contact devices transmits a response message to the alert application on the client device;

the computer program code is further configured to receive the response message from the alert server, which includes an endpoint for the one predefined contact device, wherein the endpoint is conveyed from the contact device responsive to receipt of an emergency message conveyed from the alert server to the contact device responsive to the alert application conveying the message to the alert server; and use the connection information to establish a voice over internet protocol (VOIP) session between the communication device and the contact device.

18. The computer program product of claim 17, wherein the operating system comprises a device driver that enables access to functions of an alert puck, wherein the computer program code of the application accesses the functions of the alert puck through the device driver upon being performed by the client device.

19. The computer program product of claim 17, wherein the computer program code of the alert application, upon being performed on the client device, pairs the client device with the alert puck over the PAN interface using a BLUETOOTH protocol.

20. The computer program product of claim 17, wherein computer program code for the alert application is configured to convey a signal to the alert puck to deactivate an alarm responsive to establishment of the voice over internet protocol (VOIP) session.

* * * * *